(12) United States Patent
Chen et al.

(10) Patent No.: US 9,612,388 B2
(45) Date of Patent: Apr. 4, 2017

(54) FRONT LIGHT GUIDE MODULE AND ELECTROPHORESIS DISPLAY HAVING THE SAME

(71) Applicant: E Ink Holdings Inc., Hsinchu (TW)

(72) Inventors: I-Jeng Chen, Hsinchu (TW);
Sheng-Chieh Tai, Hsinchu (TW);
Chih-Ching Yen, Hsinchu (TW);
Chin-Ju Hsu, Hsinchu (TW); Hui-Mei Fang, Hsinchu (TW); Yu-Nan Pao, Hsinchu (TW); Shu-Li Hsiao, Hsinchu (TW); Chia-Chuang Hu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 14/621,354

(22) Filed: Feb. 12, 2015

(65) Prior Publication Data
US 2015/0331176 A1 Nov. 19, 2015

(30) Foreign Application Priority Data
May 16, 2014 (TW) .............................. 103117328 A

(51) Int. Cl.
*G02B 26/00* (2006.01)
*G02F 1/03* (2006.01)
(Continued)

(52) U.S. Cl.
CPC ................ *G02B 6/005* (2013.01); *G02B 1/11* (2013.01); *G02B 1/14* (2015.01); *G02B 6/0035* (2013.01);
(Continued)

(58) Field of Classification Search
CPC .... G02F 1/167; G02F 2001/1678; G02F 1/03; G02F 1/133; G02F 1/061; G02B 26/26; G02B 26/00; G02B 26/08
(Continued)

(56) References Cited

U.S. PATENT DOCUMENTS 7,128,428 B2  10/2006  Takahashi et al.
7,472,999 B2   1/2009  Suga et al.
(Continued)

FOREIGN PATENT DOCUMENTS

TW   201005374 A   2/2010
TW   201232064     8/2012
(Continued)

*Primary Examiner* — Dawayne A Pinkney
(74) *Attorney, Agent, or Firm* — CKC & Partners Co., Ltd.

(57) ABSTRACT

A front light guide includes a light guide plate, a light source, a functional material layer and a first adhesive layer. The light guide plate has a side surface, a first surface and a second surface opposite to the first surface. The light guide plate has a first refractive index. The light source faces the side surface and configured to emit light into the light guide plate. The functional material layer is disposed at a side adjacent to the first surface, and has a third refractive index. The first adhesive layer is interposed between the light guide plate and the functional material layer so as to adhere the light guide plate with the functional material layer. The first adhesive layer has a second refractive index. The first refractive index is greater than the second refractive index, and the second refractive index is greater than the third refractive index.

13 Claims, 2 Drawing Sheets

(51) Int. Cl.

| | | |
|---|---|---|
| *G02F 1/133* | (2006.01) | |
| *G09G 3/34* | (2006.01) | |
| *G03G 17/04* | (2006.01) | |
| *F21V 8/00* | (2006.01) | |
| *G02B 1/11* | (2015.01) | |
| *G02B 1/14* | (2015.01) | |
| *G02F 1/167* | (2006.01) | |
| *G02F 1/1335* | (2006.01) | |

(52) U.S. Cl.
CPC ........... *G02B 6/0065* (2013.01); *G02F 1/167* (2013.01); *G02B 6/0093* (2013.01); *G02F 2001/133616* (2013.01)

(58) Field of Classification Search
USPC ........ 359/296, 253–254, 245, 290–291, 298; 349/33; 345/49, 105, 107; 430/31–32
See application file for complete search history.

(56) References Cited

U.S. PATENT DOCUMENTS

| | | | |
|---|---|---|---|
| 8,030,434 B2 | 10/2011 | Ikeda et al. | |
| 8,033,706 B1* | 10/2011 | Kelly | G02B 6/0036 362/307 |
| 2001/0053074 A1* | 12/2001 | Onishi | F21V 5/02 362/617 |
| 2008/0057228 A1 | 3/2008 | Horie et al. | |
| 2009/0154198 A1* | 6/2009 | Lee | G02B 6/0081 362/624 |
| 2011/0236682 A1* | 9/2011 | Okamoto | C09J 133/14 428/355 CN |
| 2012/0002281 A1 | 1/2012 | Inoue et al. | |
| 2012/0069597 A1 | 3/2012 | Sone et al. | |
| 2012/0200933 A1* | 8/2012 | Akiyama | G02B 5/0242 359/601 |
| 2012/0224108 A1 | 9/2012 | Obata | |
| 2013/0106918 A1* | 5/2013 | Bita | G02B 6/005 345/690 |
| 2016/0132145 A1* | 5/2016 | Fourie | G06F 3/044 345/174 |

FOREIGN PATENT DOCUMENTS

| | | |
|---|---|---|
| TW | 201303221 A | 1/2013 |
| TW | 201312426 A | 3/2013 |

* cited by examiner

FRONT LIGHT GUIDE MODULE AND ELECTROPHORESIS DISPLAY HAVING THE SAME

PRIORITY CLAIM AND CROSS-REFERENCE

This application claims priority to Taiwanese Application Ser. No. 103117328, filed May 16, 2014, Which is herein incorporated by reference.

BACKGROUND

Technical Field

The present disclosure relates to a front light guide module and an electrophoretic display. More particularly, the present disclosure relates to a front light guide module for an electrophoretic display, and an electrophoretic display having the front light guide module.

Description of Related Art

Electrophoretic display panels are non-luminous display panels. In general, users observe the images of electrophoretic display panels by the reflection of ambient light there from. When users are in a dark environment, electrophoretic display panels are difficult to provide satisfactory image quality. To overcome this problem, manufactures of electrophoretic display panel design a front light-source module, which is set above an electrophoretic display panel and serves as the light source thereof. When users use electrophoretic display panels in a dark environment, the front light-source module may be turned on. Light emitted from the front light-source module projects to the electrophoretic display panel, and then users can observe the displayed images.

SUMMARY

According to one aspect of the present disclosure, a front light guide module for a display is provided. The front light guide module may increase the contrast ratio of the display. The front light guide module comprises a light guide plate, a light source, a functional material layer and a first adhesive layer. The light guide plate has a side surface, a first surface and a second surface opposite to the first surface, and the light guide plate has a first refractive index. The light source is disposed adjacent to the side surface and configured to emit light into the light guide plate. The functional material layer is disposed at a side adjacent to the first surface, and the functional material layer has a third refractive index. The first adhesive layer is interposed between the light guide plate and the functional material layer, and the first adhesive layer is configured to adhere the light guide plate with the functional material layer, in which the first adhesive layer has a second refractive index. The first refractive index is greater than the second refractive index, and the second refractive index is greater than the third refractive index.

According to some embodiments of the present disclosure, the third refractive index of the functional material layer is about 1.2 to about 1.699.

According to some embodiments of the present disclosure, the functional material layer comprises a material selected from the group consisting of poly(methyl methacrylate), polycarbonate and a combination thereof.

According to some embodiments of the present disclosure, the second refractive index of the first adhesive layer is ranged between about 1.4 and about 1.699.

According to some embodiments of the present disclosure, the functional material layer comprises a substrate and an anti-glare layer, and the substrate is interposed between the anti-glare layer and the first adhesive layer.

According to some embodiments of the present disclosure, the functional material layer comprises a substrate and a hard coating, and the substrate is interposed between the had coating and the first adhesive layer.

According to some embodiments of the present disclosure, the substrate of the functional material layer is a poly(methyl methacrylate) layer, a polycarbonate layer or a composite layer of poly(methyl methacrylate) and polycarbonate.

According to some embodiments of the present disclosure, the functional material layer comprises a first substrate layer and a second substrate layer. The first substrate layer is positioned between the second substrate layer and the first adhesive layer. The thickness of the functional material layer is ranged between 80 micrometer and 300 micrometer. The thickness of the first substrate layer is ranged between 40 micrometer and 150 micrometer, and the thickness of the second substrate layer is ranged between 40 micrometer and 150 micrometer.

According to some embodiments of the present disclosure, the first substrate layer is a poly(methyl methacrylate) layer, and the second substrate layer is a polycarbonate layer.

According to some embodiments of the present disclosure, the functional material layer comprises a substrate and an adhesive enhancing layer interposed between the substrate and the first adhesive layer. The substrate has a refractive index equal to the third refractive index, and the adhesive enhancing layer has a fourth refractive index less than the third refractive index.

According to some embodiments of the present disclosure, the front light guide module further comprises a second adhesive layer disposed on the second surface of the light guide plate. The second adhesive layer has a refractive index equal to the second refractive index.

According to another aspect of the present disclosure, an electrophoretic display is provided. The electrophoretic display comprises an electrophoretic display panel, a light guide plate, a light source, a functional material layer and a first adhesive layer. The electrophoretic display panel has a display area. The light guide plate is disposed over the display area. The light guide plate has a side surface, a first surface and a second surface opposite to the first surface, in which the second surface is adjacent to the display area. The light guide plate has a first refractive index. The light source is disposed adjacent to the side surface and configured to emit light into the light guide plate. The functional material layer is disposed at a side adjacent to the first surface, and the functional material layer has a third refractive index. The first adhesive layer is interposed between the light guide plate and the functional material layer, and is configured to adhere the functional material layer with the first surface of the light guide plate. The first adhesive layer has a second refractive index. The first refractive index is greater than the second refractive index, and the second refractive index is greater than the third refractive index.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
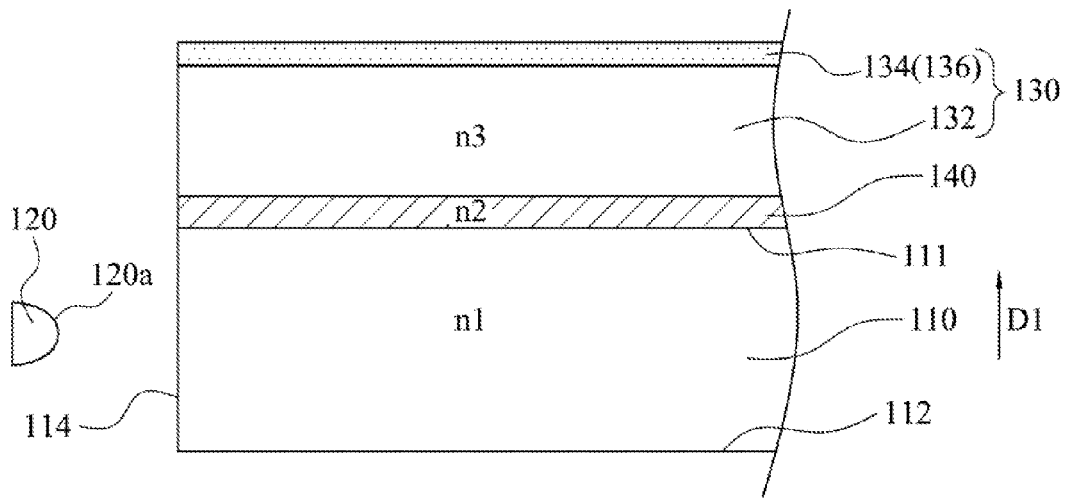
FIG. 1 is a cross-sectional view schematically illustrating a front light guide module according to various embodiments of the present disclosure.

In the following detailed description, for purposes of explanation, numerous specific details are set forth in order to provide a thorough understanding of the disclosed embodiments. It will be apparent, however, that one or more embodiments may be practiced without these specific details. In the drawings, the thickness and width of layers and regions may be exaggerated for clarity. Like reference numerals in the drawings denote like elements. The elements and regions illustrated in the figures are schematic in nature, and thus relative sizes or intervals illustrated in the figures are not intended to limit the scope of the present disclosure.

The present disclosure relates generally to a front light guide module for displays. Specific examples of components and arrangements are described below to simplify the present disclosure. These are, of course, merely examples and are not intended to be limiting. For instance, the formation of a first feature over or on a second feature in the description may include embodiments in which the first and second features are formed in direct contact, and may also include embodiments in which additional features may be formed between the first and second features, such that the first and second features may not be in direct contact. Additionally, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "below," "beneath," "above," "over" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. For example, if the device in the figures is turned over, elements described as being "below" or "beneath" other elements or features would then be oriented "above" the other elements or features. Thus, the exemplary term "below" can encompass both an orientation of above and below.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In order to allow an electrophoretic display panel to be used in a dark environment, electrophoretic display manufactures develop a front light guide, which is disposed above an electrophoretic display panel, and thereby forming an electrophoretic display with the front light guide. However, according to the research of the inventors of the present disclosure, the contrast ratio of the electrophoretic display undesirably decreases when users turn on the front light guide. In some conditions, the contrast ratio of the electrophoretic display drops 20% due to the operation of the front light guide. Therefore, the front light guide module disclosed herein is aimed to improve this problem according to some aspects of the present disclosure.

FIG. 1 is a cross-sectional view schematically illustrating a front light guide module 100 according to various embodiments of the present disclosure. The front light guide module 100 includes a light guide plate 110, a light source 120, a functional material layer 130 and first adhesive layer 140.

The light guide plate 110 has a side surface 114, a first surface 111 and a second surface 112 opposite to the first surface 111. The side surface 114 is formed between the first surface 111 and the second surface 112. In one embodiment, the side surface 114 is a light-receiving surface of the light guide plate 110, and the first surface 111 and the second surface 112 are light-emitting surfaces of the light guide plate 110. The light guide plate 110 has a first refractive index n1. The "refractive index" used in the present disclosure is measured in the thickness direction D1 of a sample layer, as shown in FIG. 1, when no otherwise specified. The first refractive index n1 of the light guide plate 110 may be in the range of about 1.4 to about 1.7, for example from 1.400 to 1.799. The light guide plate 110 may be made of a material such as poly(methyl methacrylate) (PMMA), polycarbonate (PC) or the like.

The light source 120 is disposed near the side surface 114 of the light guide plate 110, and configured to emit light into the light guide plate 110. For example, the light source 120 is arranged at a position adjacent to the side surface 114, and the light-emitting surface 120a of the light source 120 faces the side surface 114 of the light guide plate 110. There is no specific limitation on the type and the number of the light source 120. In one example, the light source 120 may include one or more light-emitting diodes which emit white light. In another example, the light source 120 may include one or more cold cathode tubes.

The functional material layer 130 is disposed at a side adjacent to the first surface 111. The functional material layer 130 has an adequate transmittance to visible light, for example a transmittance greater than 50%. In addition, the functional material layer 130 has a third refractive index n3, and significantly the third refractive index n3 must be less than the first refractive index n1 of the light guide plate 110. The third refractive index n3 may be ranged between about 1.2 and about 1.699, for example 1.2 or 1.699. In one specific embodiment, the third refractive index n3 is about 1.4 to about 1.6.

In one embodiment, the functional material layer 130 includes poly(methyl methacrylate), polycarbonate, or a composite material of poly(methyl methacrylate) and polycarbonate. Specifically, in one example, the functional material layer 130 includes a substrate layer 132 and an anti-glare layer 134, in which the substrate layer 132 is interposed between the anti-glare layer 134 and the first adhesive layer 140. In another example, the functional material layer 130 includes a substrate layer 132 and a hard coating 136, the substrate layer 132 is interposed between the hard coating 136 and the first adhesive layer 140. The substrate layer 132 may be a poly(methyl methacrylate) layer, a polycarbonate layer, a composite layer of poly(methyl methacrylate) and polycarbonate. In the examples described in this paragraph, the third refractive index n3 of the functional material layer 130 refers to the refractive index of the substrate layer 132.

The first adhesive layer 140 is interposed between the light guide plate 110 and the functional material layer 130, and the first adhesive layer 140 is configured to adhere the light guide plate 110 with the functional material layer 130. The first adhesive layer 140 has a second refractive index n2 which is between the first refractive index n1 of the light guide plate 110 and the third refractive index n3 of the functional material layer 130. In other words, the first refractive index n1 is greater than the second refractive index n2, and the second refractive index n2 is greater than the third refractive index n3.

According to some embodiments of the present disclosure, when turning on the light source of the front light guide module, which is disposed over an electrophoretic display panel, the contrast ratio of the entire display is not undesirably decreased anymore, but is dramatically increased. In other words, an unexpected technical result is provided by the feature of "the first refractive index n1 is greater than the second refractive index n2, and the second refractive index n2 is greater than the third refractive index n3".

The second refractive index of the first adhesive layer 140 may be in the range of between about 1.4 and about 1.699, for example 1.4 or 1.699. In one specific embodiment, the second refractive index is between about 1.42 and about 1.5. In one example, the first adhesive layer 140 is made of an adhesive such as Model No. 9864 provided by NITTO DENKO Corporation in Japan or Model No. 8264 provided by 3M Company in the United State.

Figure 2:
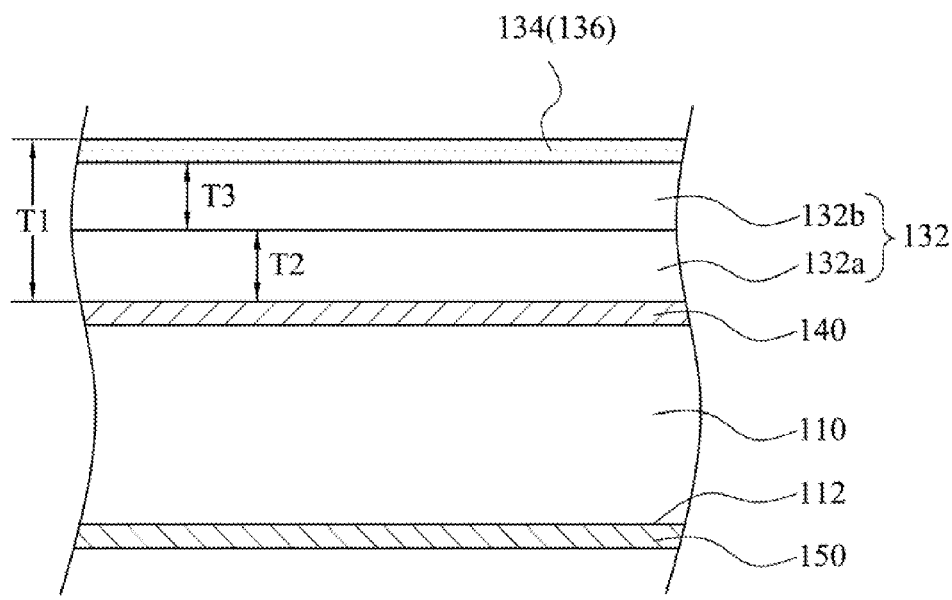
FIG. 2 is a cross-sectional view schematically illustrating a front light guide module according to another embodiment of the present disclosure.

In one embodiment of the present disclosure, as shown in FIG. 2, the substrate layer 132 of the functional material layer 130 includes a first substrate layer 132a and a second substrate layer 132b. The first substrate layer 132a is positioned between the second substrate layer 132b and the first adhesive layer 140. The total thickness T1 of the functional material layer 130 may be, for example, in the range of between about 80 micrometer (m) and about 300 micrometer (μm). The thickness T2 of the first substrate layer 132a may be, for example, between about 40 micrometer and about 150 micrometer. The thickness T3 of the second substrate layer 132b may be, for example, between about 40 micrometer and about 150 micrometer. In the embodiment described in this paragraph, the light guide plate 110 may be made of polycarbonate, for example. The first substrate layer 132a may be, for example, a poly(methyl methacrylate) layer, and the second substrate layer 132b may be, for example, a polycarbonate layer.

In another embodiment, the front light guide module further includes a second adhesive layer 150 disposed on the second surface 112 of the light guide plate 110, as shown in FIG. 2. In one example, the refractive index of the second adhesive layer 150 is substantially equal to the second refractive index n2. The material of the second adhesive layer 150 may be the same as that of the first adhesive layer 140, for example.

Figure 3:
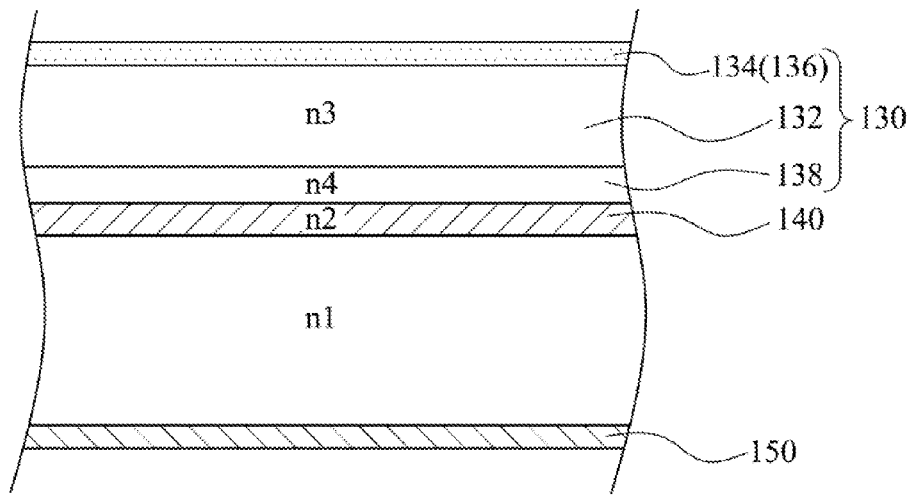
FIG. 3 is a cross-sectional view schematically illustrating a front light guide module according to still another embodiment of the present disclosure.

In still another embodiment, as shown in FIG. 3, the functional material layer 130 includes an anti-glare layer 134 (or a hard coating 136), a substrate layer 132 and an adhesive enhancing layer 138. The adhesive enhancing layer 138 is interposed between the substrate layer 132 and the first adhesive layer 140. In one example, the refractive index of the substrate layer 132 is substantially equal to the third refractive index n3. The adhesive enhancing layer 138 has a fourth refractive index n4 that is less than the third refractive index n3. The fourth refractive index n4 may be in the range of between about 1.1 and about 1.3, for example. The adhesive enhancing layer 138 is employed to improve the problem in poor adhesion between the first adhesive layer 140 and the substrate layer 132. According to several experimental examples, when the substrate layer 132 includes poly(methyl methacrylate) and/or polycarbonate, the substrate layer 132 containing polycarbonate and poly (methyl methacrylate) suffers poor adhesion with many adhesives. In specifics, as poly(methyl methacrylate) and/or polycarbonate contact with adhesives, a number of bubbles appear at the interface between the substrate layer 132 and the adhesives in many cases so that the adhesion between the substrate layer 132 and the adhesives is decreased to an unacceptable level. The adhesive enhancing layer 138 is used to avoid this problem. When the adhesive enhancing layer 138 is employed, it provides greater choice of material of the first adhesive layer 140. It is noted that the front light guide module disclosed herein is not necessary to include the adhesive enhancing layer 138. For example, in the embodiment described hereinbefore in connection with FIG. 1, the front light guide module is not provided with any adhesive enhancing layer 138.

Figure 4:
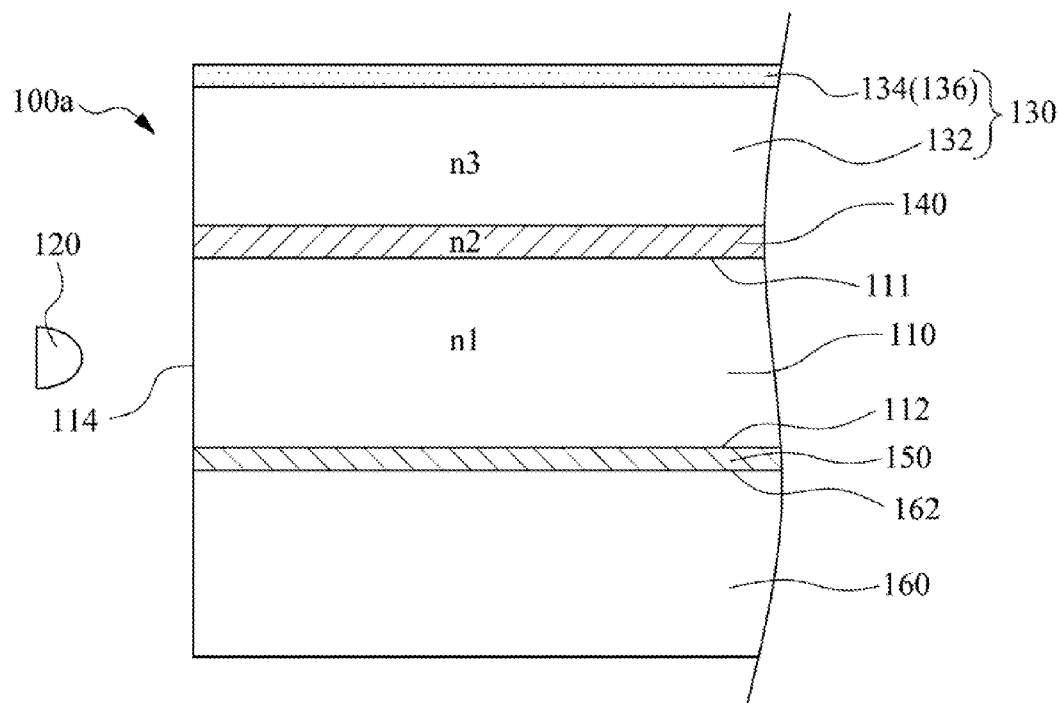
FIG. 4 is a cross-sectional view schematically illustrating an electrophoretic display according to various embodiments of the present disclosure.

According to another aspect of the present disclosure, an electrophoretic display is provided. FIG. 4 is a cross-sectional view schematically illustrating an electrophoretic display 200 according to various embodiments of the present disclosure. The electrophoretic display 200 includes a front light guide module 100a and an electrophoretic display panel 160. The electrophoretic display panel 160 has a display area 162, on which the front light guide module 100a is disposed.

The front light guide module 100a may be a front light guide module described in any embodiments or examples hereinbefore. Briefly, the front light guide module 100a includes a light guide plate 110, a light source 120, a functional material layer 130 and a first adhesive layer 140. The light guide plate 110 is disposed over the display area 162, and the light guide plate 110 has a first surface 111, a second surface 112 and a side surface 114. The first surface 111 is opposite to the second surface 112 which is arranged at a side adjacent to the display area 162. The light guide plate 110 has a first refractive index n1. The light source 120 faces the side surface 114 of the light guide plate 110, and is configured to emit light into the light guide plate 110 through the side surface 114. The functional material layer 130 is disposed at a side near the first surface 111, and the functional material layer 130 has a third refractive index n3. The first adhesive layer 140 is disposed between the light guide plate 110 and the functional material layer 130, and the first adhesive layer 140 adheres the functional material layer 130 with the first surface 111 of the light guide plate 110. The first adhesive layer 140 has a second refractive index n2. The first refractive index n1 of the light guide plate 110 is greater the second refractive index n2 of the first adhesive layer 140, and the second refractive index n2 is greater than the third refractive index n3 of the functional material layer 130.

In one embodiment, the functional material layer 130 includes a substrate layer 132 and an anti-glare layer 134 (or as hard coating 136). In another embodiment, the front light guide module 100a is adhered on the electrophoretic display panel 160 by a second adhesive layer 150. In one example, the refractive index of the second adhesive layer 150 is substantially equal to the second refractive index n2 of the first adhesive layer 140.

Table 1 shows important parameters and contrast ratios of light guide modules according to a comparative example and an embodiment of the present disclosure. In the comparative example, the substrate of the functional material layer is made of polyethylene terephthalate (PET), and the light guide plate is made of PMMA. The original contrast ratio of the electrophoretic display panel is 19.05 in this comparative example. When the light source of the front light guide module is turned on, the contrast ratio of the entire display is decreased to 18.35. On the other hand, in the embodiment, the functional material layer is a composite layer of PC and PMMA, arranged in a way described hereinbefore in connection with FIG. 2, and the light guide plate is made of PC. The original contrast ratio of the electrophoretic display panel is 19.5. When the light source of the front light guide module is turned on, the contrast ratio of the entire display is increased to 23.4. From the results shown in Table 1, the contrast ratio of the entire electrophoretic display may be dramatically increased by the usage of the front light guide module according to the embodiments of the present disclosure.

TABLE 1

|  | comparative example | embodiment |
|---|---|---|
| Functional material layer material | PET | PC + PMMA |
| First adhesive layer material | NITTO Model No. 9864 | NITTO Model No. 9864 |
| Light guide plate material | PMMA | PC |
| Original contrast ratio of the electrophoretic display panel | 19.05 | 19.42 |
| Brightness of the region showing while color when light source is turned on, W (nits) | 181.5 | 181.9 |
| Brightness of the region showing black color when light source is turned on, B (nits) | 9.89 | 7.77 |
| Contrast ratio of the entire electrophoretic display, CR2 = W/B | 18.4 | 23.4 |
| Rate of increase in contrast ratio | −3.8% | 20.5% |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A front light guide module for a display, comprises:
a light guide plate having a side surface, a first surface and a second surface opposite to the first surface, the light guide plate having a first refractive index;
a light source disposed adjacent to the side surface and configured to emit a light into the light guide plate;
a functional material layer disposed at a side adjacent to the first surface, the functional material layer having a third refractive index; and
a first adhesive layer interposed between the light guide plate and the functional material layer, and configured to adhere the light guide plate with the functional material layer, the first adhesive layer having a second refractive index;
wherein the first refractive index is greater than the second refractive index, and the second refractive index is greater than the third refractive index, wherein a direction of refractive index increase is from the functional material layer to the light guide plate, which is adjacent to and closest to the light source.

2. The front light guide module according to claim 1, wherein the third refractive index of the functional material layer is ranged between 1.2 and 1.699.

3. The front light guide module according to claim 1, wherein the functional material layer comprises a material selected from the group consisting of poly(methyl methacrylate), polycarbonate and a combination thereof.

4. The front light guide module according to claim 1, wherein the second refractive index of the first adhesive layer is ranged between 1.4 and 1.699.

5. The front light guide module according to claim 1, wherein the functional material layer comprises a substrate and an anti-glare layer, and the substrate is interposed between the anti-glare layer and the first adhesive layer.

6. The front light guide module according to claim 5, wherein the substrate is a poly(methyl methacrylate) layer, a polycarbonate layer or a composite layer of poly(methyl methacrylate) and polycarbonate.

7. The front light guide module according to claim 1, wherein the functional material layer comprises a substrate and a hard coating, and the substrate is interposed between the hard coating and the first adhesive layer.

8. The front light guide module according to claim 7, wherein the substrate is a poly(methyl methacrylate) layer, a polycarbonate layer or a composite layer of poly(methyl methacrylate) and polycarbonate.

9. The front light guide module according to claim 1, wherein the functional material layer comprises a first substrate layer and a second substrate layer, the first substrate layer being positioned between the second substrate layer and the first adhesive layer, wherein the functional material layer has a thickness between 80 micrometer and 300 micrometer, the first substrate layer has a thickness between 40 micrometer and 150 micrometer, and the second substrate layer has a thickness between 40 micrometer and 150 micrometer.

10. The front light guide module according to claim 9, wherein the first substrate layer is a poly(methyl methacrylate) layer, and the second substrate layer is a polycarbonate layer.

11. The front light guide module according to claim 1, wherein the functional material layer comprises a substrate and an adhesive enhancing layer interposed between the substrate and the first adhesive layer, wherein the substrate has a refractive index equal to the third refractive index, and the adhesive enhancing layer has a fourth refractive index less than the third refractive index.

12. The front light guide module according to claim 1, further comprising a second adhesive layer disposed on the second surface of the light guide plate, wherein the second adhesive layer has a refractive index equal to the second refractive index.

13. An electrophoretic display, comprises:
an electrophoretic display panel having a display area;
a light guide plate disposed on the display area, and having a side surface, a first surface and a second surface opposite to the first surface, wherein the second surface is adjacent to the display area, and the light guide plate has a first refractive index;
a light source disposed adjacent to the side surface and configured to emit a light into the light guide plate;
a functional material layer disposed at a side adjacent to the first surface, the functional material layer having a third refractive index; and
a first adhesive layer interposed between the light guide plate and the functional material layer, and configured to adhere the functional material layer with the first surface of the light guide plate, wherein the first adhesive layer has a second refractive index;

wherein the first refractive index is greater than the second refractive index, and the second refractive index is greater than the third refractive index, wherein a direction of refractive index increase is from the functional material layer to the light guide plate, which is adjacent to and closest to the light source.

* * * * *